United States Patent [19]

Bachmann et al.

[11] Patent Number: 4,543,975
[45] Date of Patent: Oct. 1, 1985

[54] FLUID PRESSURE REGULATING VALVE MECHANISM

[75] Inventors: Wilhelm Bachmann, Langenhagen; Axel Kemner, Isernhagen, both of Fed. Rep. of Germany

[73] Assignee: WABCO Westinghouse Steuerungstechnik GmbH, Hannover, Fed. Rep. of Germany

[21] Appl. No.: 562,765

[22] Filed: Dec. 19, 1983

[30] Foreign Application Priority Data

Dec. 20, 1982 [DE] Fed. Rep. of Germany ....... 3247071

[51] Int. Cl.$^4$ ..................... G05D 16/00; F16K 31/365
[52] U.S. Cl. ......................................... 137/85; 137/84
[58] Field of Search ...................... 137/85, 84, 116.3

[56] References Cited

U.S. PATENT DOCUMENTS

| | | | |
|---|---|---|---|
| 2,958,337 | 11/1960 | Holbrook | 137/85 X |
| 3,375,843 | 4/1968 | Buratti | 137/85 |
| 4,285,357 | 8/1981 | Imes | 137/85 |

*Primary Examiner*—Alan Cohan
*Attorney, Agent, or Firm*—G. E. Hawranko

[57] ABSTRACT

A fluid pressure regulating valve includes a diaphragm piston reciprocally movable within a valve housing, whereby undesirable diaphragm piston flutter is effectively dampened by use of a dampening member. The diaphragm piston separates a control chamber from an outlet chamber which is in communication with a fluid pressure receiving device. A selectively controllable solenoid valve controls the fluid pressure level in the control chamber. Differences in fluid pressure levels across the diaphragm piston result in the reciprocal movement, thereby, such movement being preconditioned to occur as a function of the fluid pressure level in the control chamber. An inlet valve and an outlet valve each communicate with the outlet chamber and are operated according to the position of the diaphragm piston. Furthermore, the inlet and outlet valves are connected by a connecting rod such that their operation is mutually dependent. A bias spring contacts a portion of the outlet valve to provide a preconditioning to a closed position. The output of the outlet valve exhausts to atmosphere through a hollow portion of the dampening member. The dampening member is resiliently connected on one end to a valve stem in which the outlet valve is formed and on the other end to a portion of the housing.

9 Claims, 1 Drawing Figure

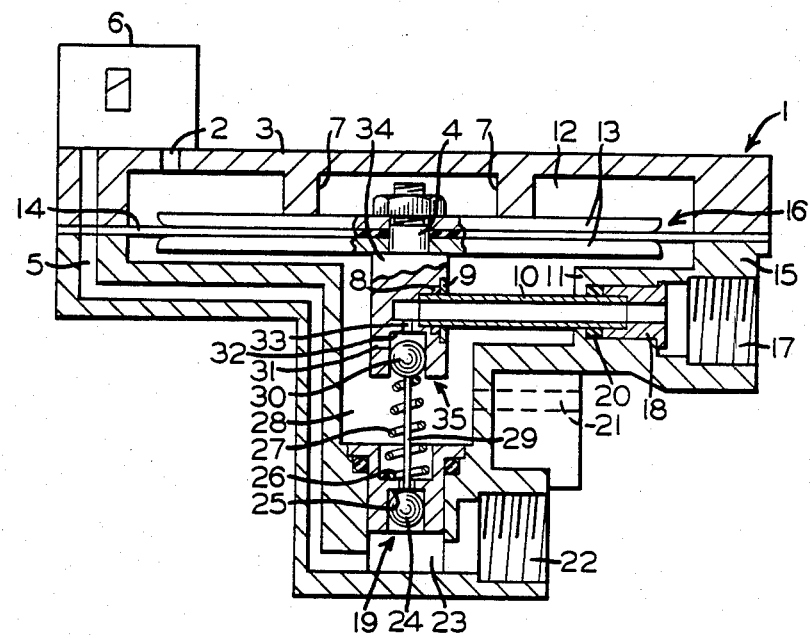

FLUID PRESSURE REGULATING VALVE MECHANISM

BACKGROUND OF THE INVENTION

This invention relates to a fluid pressure regulating valve mechanism; in particular, such a valve mechanism that substantially eliminates diaphragm flutter as can occur where a reciprocally movable diaphragm piston is acted upon by opposing fluid pressures. Such regulating-type valve mechanisms generally exhibit a proportional relationship between a control fluid pressure and an output fluid pressure. Such proportionality can be further varied by altering the structure of the diaphragm piston allowing for various modes of operation of the valve mechanism. Examples of such modes are: pressure intensification, pressure reduction, and a relay mode where a 1=1 ratio between control fluid pressure and output fluid pressure is maintained.

Typical regulating valve mechanisms have utilized an operating piston made of a metallic material and guided within a guide bore sealed by means of gaskets. This type of valve structure, however, has a disadvantage in that, the conventional sealing elements contribute a relatively high hysteresis regulating in a valve having undesirable delay characteristics. Still other regulating valves to date, have designed the piston as a diaphragm piston which avoids the problem of the high hysteresis delay condition but experiences a problem with diaphragm flutter. Such a valve mechanism is disclosed in the German Patent Publication DE-AS 15 23 493. The diaphragm piston of this valve mechanism consists of a first diaphragm which can be acted upon by the control fluid pressure, and a second diaphragm designed as a rolling membrane which can be acted upon by the output fluid pressure. The diaphragm piston serves the tripping of a combination inlet and outlet valve.

In case of a diaphragm piston consisting of a single diaphragm or of two diaphragms which act together with a valve, the problem surfaces that the oscillations of the diaphragm piston, generated by the pressure medium, are transmitted to the valve which can lead to a fluttering of the valve. The result may be an inaccurate pressure control and damage of the valve mechanism.

SUMMARY OF THE INVENTION

The object of the invention, therefore, is to provide a fluid pressure regulating valve mechanism whereby oscillations of the piston, especially of the piston designed as a diaphragm piston, are substantially eliminated.

It is a further object of the invention that such avoidance of diaphragm piston oscillation, or flutter, is accomplished with substantially little or no detrimental effect or impediment to the operation of the valve mechanism.

It is yet a further object of the invention that such diaphragm piston damping utilize as many existing components of the valve mechanism as possible thus eliminating the need for a substantial number of additional components which results in manufacturing and maintenance costs that are reasonable.

Briefly, the invention consists of a valve housing in which is secured a diaphragm piston that separates a control chamber from an output chamber. An outlet valve, formed in a valve stem which is secured to the diaphragm piston, operates to an open or closed position as a function of the difference in fluid pressures between the control chamber and output chamber. A discharge tube, connected on one end to the valve stem and on the other end to a portion of the valve body, tends to damp movement of the valve stem and diaphragm piston. This discharge tube also serves to connect the output chamber to atmosphere when the outlet valve is in the open position. An inlet valve is formed in an offset of the valve body and is operably connected to the outlet valve such that following closure of the outlet valve, the inlet valve opens and connects the fluid pressure source to the device to be operated by the valve mechanism. A bias spring contacts the outlet valve, biasing the outlet valve toward a closed position which simultaneously preconditions the inlet valve to a closed position by way of the connection between the inlet and outlet valves. A passageway leads from an inlet chamber to a solenoid valve, which is electronically controlled and which, when opened, allows fluid pressure to charge the control chamber to the selected pressure value.

BRIEF DESCRIPTION OF THE DRAWING

FIG. 1 is a sectional view of a valve mechanism constructed in accordance with the invention.

DESCRIPTION AND OPERATION

As shown in FIG. 1, a fluid pressure regulating valve mechanism embodying the invention consists of an upper housing portion 3 and a lower housing portion 15. Secured between the upper housing portion 3 and the lower housing portion 15 is a diaphragm piston 16 made of a diaphragm portion 14 and an upper and lower piston portion 13. The diaphragm piston 16 separates a control chamber 12, located in the upper housing portion 3, and an outlet chamber 28 located in the lower housing portion 15. A pressure outlet 21 extends from the outlet chamber 28 and provides a connection to a pressure-controlled device (not shown).

A valve stem 34 is secured at approximately the center point of the diaphragm piston 16 such that, the valve stem 34 moves with the diaphragm piston 16 in an even, non-slanting manner. A graduated clearance 33 is formed in the end of the valve stem 34 opposite the connection to the diaphragm piston 16. This graduated clearance 33, together with a first valve body 30, forms an outlet valve 35 having a first valve seat 32 formed at the point where the graduated cylinder 33 changes in dimension. A cross boring 31 is also formed in the valve stem 34 near the first valve seat 32 such that, communication between the outlet chamber 28 and the graduated clearance 33 is provided. A discharge tube 10 attaches to the valve stem 34 at the output of the outlet valve 35. The discharge tube 10 is secured to the valve stem 34 by means of a first gasket 8 and a first sealing ring 9. The end of the discharge tube 10, opposite the valve stem 34, is attached to the lower housing portion 15 in a similar manner. However, rather than fitting into a movable element, as in the case of the valve stem 34, this second end of the discharge tube 10 fits into a bushing 18 which is secured to the lower housing portion 15 adjacent the discharge outlet 17. A second gasket 20 is fitted between the bushing 18 and a front end stop 11 formed on the lower housing portion 15 adjacent the outlet chamber 28. It should be noted that the discussed discharge tube 10 arrangement provides, on one hand, a stabilizing means against diaphragm piston 16 flutter and, on the other hand, the flexibility needed to accommodate movement of the valve stem 34 as occurs during operation of the regulating valve mechanism 1.

A second valve body 24, associated with a second or inlet valve 19 formed in a valve housing offset 4, is connected via a connecting rod 29 to the first valve body 30 such that, the operation of this inlet valve 19 is a function of the state of the outlet valve 35. A second valve seat 25 is also formed in the valve housing offset 4 as a part of the inlet valve 19. The inlet valve 19, in the open position, serves to connect an inlet chamber 23 to the outlet chamber 28. The inlet chamber is in communication with a fluid pressure source (not shown) via an inlet opening 22.

A bias spring 27, seated on one end within a spring seat 26 formed in the valve housing offset 4, surrounds at least a portion of the connecting rod 29. The end of the bias spring 27, opposite the spring seat 26, contacts the first valve body 30 to bias the first valve body 30 to a position whereby, due to the connection between the first and second valve bodies 30, 24, the inlet valve 19 is biased to a closed position under static conditions. Extending from the inlet chamber 23, is a control passageway 5 which connects the inlet chamber 23 to the control chamber 12 upon an open condition of a solenoid valve 6. The solenoid valve 6 is controlled by electronic logic (not shown) to selectively vary the amount of fluid pressure present in the control chamber 12. A control connection 2, provided at the output of the solenoid valve 6, connects the solenoid valve 6 to the control chamber 12. Piston stops 7 are provided in the control chamber 12 to limit the amount of travel of the diaphragm piston 16 into the control chamber 12.

In operation, the fluid pressure regulating valve mechanism 1 operates to supply fluid pressure to a receiving device (not shown) in an amount which is a function of the fluid pressure level in the control chamber 12. By varying the fluid pressure level in the control chamber 12, the fluid pressure delivered to the receiving device is varied by a commensurate amount once the threshold fluid pressure level needed to open the inlet valve 19 has been reached.

Presuming the valve mechanism 1 is in the condition shown in FIG. 1, the amount of fluid pressure in the control chamber 12, prior to opening of the solenoid valve 6, is substantially equal to the fluid pressure level in the outlet chamber 28, that fluid pressure level essentially being atmospheric pressure. The diaphragm piston 16 is, therefore, at rest leaving the outlet valve 35 open and connecting the outlet chamber 28 to atmosphere via the cross boring 31, graduated clearance 33, discharge tube 10, and discharge outlet 17.

The threshold fluid pressure level needed to initiate valve mechanism 1 operation is achieved by introducing fluid pressure to the inlet opening 22. The fluid pressure passes through the inlet chamber 23 and passed the inlet valve 19 which is initially in the closed position. From the inlet chamber 23, the fluid pressure flows through the control passageway 5 to an inlet side of the solenoid valve 6. Operation of the solenoid valve 6 is controlled by electronic logic (not shown) which opens the solenoid valve 6, allowing a preselected amount of fluid pressure into the control chamber 12. The fluid pressure which builds in the control chamber 12 effects movement of the diaphragm piston 16 in the direction of the outlet chamber 28. The valve stem 34 moves with the diaphragm piston 16 and effects closure of the outlet valve 35. This outlet valve 35 closure occurs as the first valve seat 32 contacts the first valve body 30 which is biased toward the first valve seat 32 by the bias spring 27. The outlet chamber 28 is then no longer connected to the discharge tube 10 and discharge outlet 17. As fluid pressure continues to build in the control chamber 12, the diaphragm piston 16 moves further in the direction of the outlet chamber 28. At this level, which has been previously described as the threshold fluid pressure level, the inlet valve 19 opens, allowing fluid pressure from the source to flow into the outlet chamber 28. This inlet valve 19 opening occurs as the valve stem 34 forces the first valve body 30 downward, as shown in FIG. 1. Due to the connecting rod 29 connecting the first valve body 30 to the second valve body 24, the second valve body 24 is forced off of the second valve seat 25. Fluid pressure can then flow through the open inlet valve 19, through the outlet chamber 28, through the pressure outlet 21, and to the receiving device (not shown). The fluid pressure within the receiving device, and hence within the outlet chamber 28, will rise to a point whereby it is equal to the fluid pressure level within the control chamber 12. The diaphragm piston 16 will move upward in the direction of the control chamber 12. As the diaphragm piston 16 moves in this upward direction, as shown in FIG. 1, the first valve body 30 moves as well, due to the urging of the bias spring 27. In this manner, it can be appreciated that the operation of the valve mechanism 1 does not immediately reverse from a supply to an exhaust condition since the inlet valve 19 closes while the exhaust valve 35 does not immediately open, but remains closed as well.

In either direction of movement by the diaphragm piston 16, it can be appreciated that such movement is tempered; that is, dampened by the presence of the discharge tube 10. While serving to connect the outlet valve 35 to atmosphere when the outlet valve 35 is open, the discharge tube 10 also acts to dampen movement of the diaphragm piston 16 because of the essentially resilient gasket arrangement 8, 20. The effect of this dampened diaphragm piston 16 movement, together with the delay in valve operation in going from a supply to an exhaust mode, substantially eliminates the problems of valve flutter. Also contributing to dampening properties of the discharge tube 10 is the material of which it is made. A flexible material such as, for example, an elastomeric material, can be used.

A further consideration in the design of the discharge tube 10 is the length and the location thereof. It will be noted that the discharge tube 10 is approximately equal in length to the radial length of the piston portions 13, thus acting in the manner of a beam and providing the necessary stabilizing properties generally associated with a beam. Because the discharge tube 10 extends through an elongated portion of the outlet chamber 28, this increased length is achieved. The location of the discharge tube 10 within the outlet chamber 28 also provides a safe failure feature in that, should the discharge tube 10 break, the outlet chamber 28 would be connected to the discharge outlet 17 regardless of the condition of the outlet valve 35.

If the fluid pressure level to the receiving device is to be reduced, the fluid pressure level in the control chamber 12 is reduced. The fluid pressure difference between the control chamber 12 and the outlet chamber 28 will then be in favor of the outlet chamber 28 causing the diaphragm piston to move further toward the control chamber 12. Piston stops 7 limit the movement of the diaphragm piston 16 towards the control chamber such that the diaphragm piston 16 is stabilized at approximately a zero fluid pressure difference between said control chamber 12 and said outlet chamber 28. The outlet valve 35 will then open, connecting the outlet chamber 28 to atmosphere via the discharge tube 10 and discharge outlet 17. The fluid pressure level in the receiving device is, therefore, reduced to the desired level when the equilibrium point between the control chamber 12 and output chamber 28 is reached, thus stopping movement of the diaphragm piston 16.

While the above discussion presents the preferred embodiment of the invention, it can be appreciated that modifications can be made which fall within the intent of the invention. Such a modification could be to alter the structure of the diaphragm piston such that, instead of a relay-type operation, a pressure intensification or a pressure reduction mode could be achieved.

We claim:

1. A fluid pressure regulating valve for use with a receiving device, said regulating valve comprising:
   (a) a valve housing;
   (b) a diaphragm piston reciprocally movable within said housing;
   (c) a control chamber disposed adjacent a first side of said diaphragm;
   (d) an outlet chamber disposed adjacent a second side of said diaphragm piston opposite said first side;
   (e) a valve stem secured to said diaphragm piston for coincident movement therewith;
   (f) a discharge tube resiliently connected on a first end to said valve stem and on a second end to said housing such that, movement of said diaphragm piston is substantially dampened by such resilient connection, said discharge tube further having a hollow center portion for passage of fluid pressure therethrough to atmosphere, such resilient connection of said discharge tube being achieved by a first flexible gasket disposed on said first end of said discharge tube and held in a gasket slot formed in said valve stem, and a second flexible gasket disposed on said second end and held in a bushing secured to said housing;
   (g) pressure supply means for pressurizing said control chamber to a preselected fluid pressure level;
   (h) inlet chamber formed in said housing and in communication with said pressure supply means; and
   (i) valving means formed partially on said valve stem for controlling the flow of such fluid pressure between said outlet chamber and said discharge tube, and for controlling the flow of such fluid pressure between said inlet chamber and said outlet chamber.

2. A fluid pressure regulating valve, as set forth in claim 1, wherein said discharge tube is composed of a flexible elastomeric material.

3. A fluid pressure regulating valve, as set forth in claim 2, wherein said valve stem is connected to said diaphragm piston at approximately the axial center of said diaphragm piston.

4. A fluid pressure regulating valve, as set forth in claim 1, wherein said valve means includes an inlet valve, an outlet valve located in the portion of said valve stem extending into said control chamber, and a connecting rod extending therebetween to connect said inlet valve to said outlet valve such that, operation of said inlet valve and said outlet valve is mutually dependent.

5. A fluid pressure regulating valve, as set forth in claim 4, wherein said outlet valve includes a first valve seat and a first valve body and said inlet valve includes a second valve seat and a second valve body, said first valve body and said second valve body being connected by said connecting rod.

6. A fluid pressure regulating valve, as set forth in claim 5, further comprising a bias spring surrounding at least a portion of said connecting rod and contacting said first valve body such that, said outlet valve is preconditioned to connect said outlet chamber to said discharge tube.

7. A fluid pressure regulating valve, as set forth in claim 1, wherein said diaphragm piston has at least one circular-shaped piston portion and a diaphragm portion secured around the inner circumference of said housing between said control chamber and said outlet chamber, and further, wherein said discharge tube corresponds in length to approximately the radial length of said circular-shaped piston portion.

8. A fluid pressure regulating valve, as set forth in claim 1, wherein said discharge tube extends through an elongated portion of said outlet chamber such that, an increased length of said discharge tube between said movable, resiliently-connected first end and said stationary, resiliently-connected second end is achieved.

9. A fluid pressure regulating valve, as set forth in claim 1, further comprising at least one piston stop disposed in said control chamber for limiting displacement of said diaphragm piston to a central position corresponding to a fluid pressure equilibrium between said control chamber and said outlet chamber.

* * * * *